Figure 1:
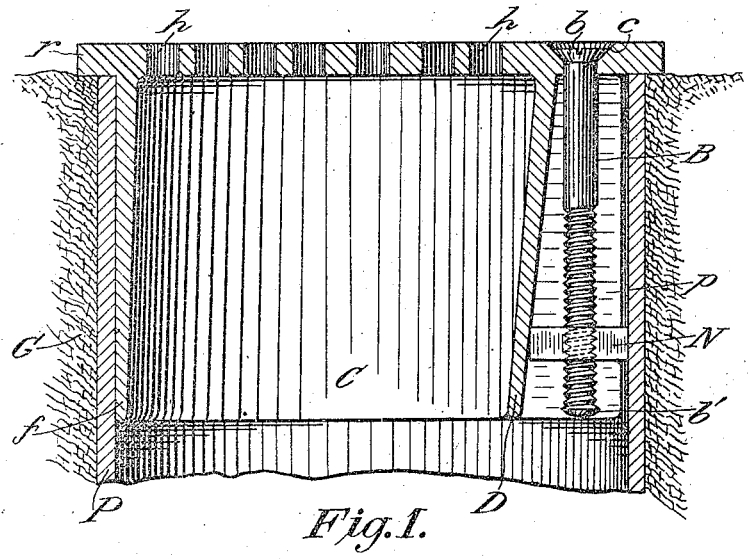

H. H. DAUPHINEE.
COVER FOR VENT PIPES OR THE LIKE.
APPLICATION FILED OCT. 22, 1915.

1,191,497.

Patented July 18, 1916.

INVENTOR
Henry H. Dauphinee
BY
Arthur F. Smington
ATTORNEY

0
UNITED STATES PATENT OFFICE.

HENRY H. DAUPHINEE, OF PROVIDENCE, RHODE ISLAND.

COVER FOR VENT-PIPES OR THE LIKE.

1,191,497.  Specification of Letters Patent.  Patented July 18, 1916.

Application filed October 22, 1915. Serial No. 57,251.

*To all whom it may concern:*

Be it known that I, HENRY H. DAUPHINEE, a subject of the King of Great Britain, residing at Providence, in the county of Providence, State of Rhode Island, have invented certain new and useful Improvements in Covers for Vent-Pipes or the like, of which the following is a specification.

My invention relates to caps or covers for vent-pipes, manholes or the like and consists particularly of improvements in the means for securing the cover in place to prevent its accidental or unwarranted removal.

The object of my improvement is to provide a simple, efficient and easily operated fastening-device for holding the cover in place in the pipe to prevent it from being tampered with by unauthorized persons or by those mischievously inclined.

A further object of my improvement is to provide a locking- or securing-means self-contained in the cover itself so that the latter may be used on the ordinary straight pipe without requiring special attachments or fittings therefor.

The preferred manner and means for carrying out my improvement are fully described in the following specification, illustrated by the accompanying drawings, in which like reference characters designate like parts.

In the drawings: Figure 1 is a vertical, sectional view of a vent-pipe shown as set upright in the ground and illustrating my improved cap or cover applied thereto; and Fig. 2 is an underneath view of the cover, looking upwardly from the bottom of the pipe, showing the method of operation of the locking-means.

Referring first to Fig. 1, P designates a usual vertically-arranged vent-pipe which extends down through the ground G and connects with the sewer- or soil-pipe to ventilate the latter. To prevent the vent-pipe from becoming choked with dirt, stones or other matter a cap is usually employed to cover its exposed end and generally this is merely arranged to set into the pipe with its flange overhanging the top to hold it in place. Often these covers are removed by mischievously-inclined boys or persons of evil intent and stones and other refuse are thrown into the pipe. This frequently causes the sewer- or drain-pipe to become clogged or completely stopped up and requires digging it up for cleaning. It is often a very expensive operation to take up the pipe to clean it and then relay it again, and my improvement is designed to obviate the cause for such a contingency.

Figure 2:
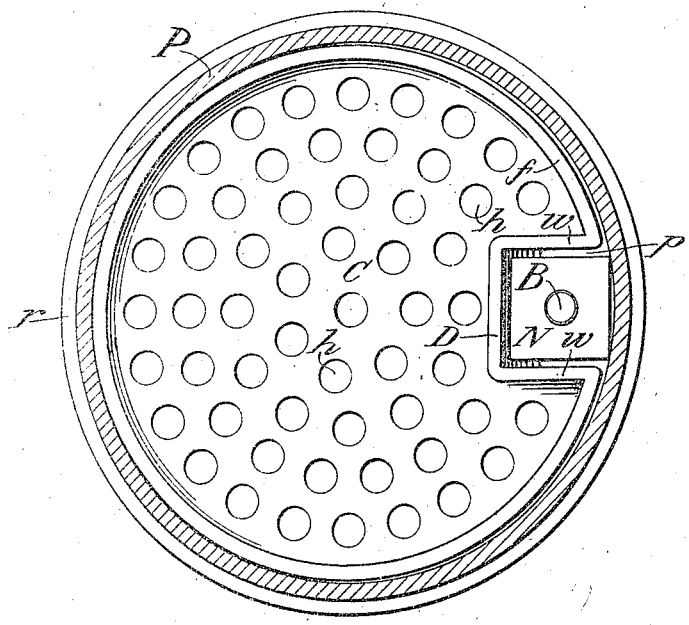

As illustrated in Figs. 1 and 2, I propose to construct my improved cap or cover C of the same form as those generally used for the purpose described, but in addition I provide as a self-contained part of the cover a friction-lock or holding-device for securing it in the pipe-opening as next explained. Usually the cover C is of circular form, but it might be made of square, polygonal or any other shape in accordance with the character of the pipe with which it is to be used. As here illustrated the cover C is of circular shape having a relatively deep flange *f* adapted to fit within the opening of the pipe P with a slight clearance, and formed with an overhanging rim *r* arranged to overhang and rest upon the upper end of the pipe. Usually the top of the cap or cover C is perforated with a number of relatively small holes or air-openings *h* which provide a vent through the pipe without allowing the ingress thereto of stones, sticks, leaves or other foreign matter. If desired the top of the cover might be made in the form of a lattice or grating as sometimes provided.

In applying my improvement to the type of cover above described I form the latter with an inclined web or partition D extending downwardly from its top adjacent the inside of the flange *f*. Preferably the web D forms the inner wall of a pocket *p* which opens out along the side of the flange *f* as shown most clearly in Fig. 2. That is to say, the circular flange *f* is cut away along its side from the rim *r* clear to the bottom of the cover and the channel or opening *p* so formed is inclosed by side walls *w*, *w* and backed by the inner, inclined wall or web D. In this way, a rectangular passage or channel is provided on the side of the cover adapted to receive a square nut N arranged to slide therein. Extending down through the top of the cover C is a cap-screw or bolt B having its tapered head *b* seated in a countersunk hole *c* and arranged with its threads engaging the threaded hole of the nut N. Preferably, the cover C is made in one piece of cast iron and the bolt B and nut N are constructed of bronze, brass or other non-corrosive material to prevent the parts from rusting together. The bolt B passes through the hole in the top of the cover C with a free fit and its head is countersunk somewhat below the surface to provide for a slight rocking motion without exposing its edge above the cover. The nut N is of a size to adapt it to fit the bottom of the pocket $p$ with a slight clearance on the sides, but when drawn upwardly by the bolt B it will wedge between the inclined web or wall D and the inside of the pipe P as shown in Fig. 1. Preferably, the lower end of the bolt is headed over or upset slightly at $b'$ to prevent the nut N from being lost off when it is forced down into the lower end of the channel $p$. The head of the bolt B may be slotted as shown in Fig. 1 to receive a screwdriver, or if desired it might be formed with openings to receive the prongs of a wrench as sometimes provided.

The method of operation of the complete device is as follows: Before setting the cover in place the screw B is turned to the left to force the nut N down toward the bottom of the channel $p$, the sides $w$, $w$ of the latter holding the nut from turning during this operation. With the nut N in position adjacent the bottom of the flange $f$ the latter may be entered freely into the opening of the pipe P and will drop down into place with the rim $r$ resting on the end of the pipe as shown in Fig. 1. After the cover C has been set in place as above described the screw B is turned to the right and this draws the nut N upwardly in the channel $p$ with its inner side sliding along the face of the web D. As the web or wall D is inclined outwardly toward the side of the cover in the direction approaching its upper end it will have a tendency to force the nut N laterally against the inside of the pipe P. That is to say, as the nut N slides upwardly along the web D it will be wedged against the inside of the pipe P and will therefore force the cover C tightly against the opposite wall of the pipe to bind it firmly in place. In other words, the nut N and web D have a wedging action which serves to impinge the cover against the inside of the pipe P to prevent its removal until the nut is released. In this manner the cover is held securely in position without danger of its being removed with mischievous intent.

It will be seen that my invention provides an extremely simple and efficient means for holding a cap or cover in place and one which is self-contained in the cover and requires no fittings or attachments to be applied to the pipe itself. It is also most convenient and easy to operate and is practically proof against derangement or getting out of order.

My improved cover can be manufactured at very slight cost, being practically all in one piece with only two added parts, the screw and nut, which are of standard size, and hence may be procured at small expense. Besides being adapted for use with vent-pipes for sewers or drains my improved cover is capable of being applied to other purposes such as the closing of manholes, traps, ports, hatches or other openings.

Various modifications might be made in the structure and arrangement of my improved device without departing from the spirit or scope of the invention.

Therefore, without limiting myself to the exact embodiment shown, what I claim is:—

1. In a cap or cover for vent-pipes or the like, the combination with a depending flange fitted to the interior of the pipe and formed with an inclined web extending downwardly from the top of the cover, of a bolt rotatable in a bearing adjacent said web, and means on said bolt adapted to be slid along the web to cause it to wedge against the interior of the pipe within which the cover sets.

2. In an improved closure for pipes or manholes, the combination with a cover formed with a flange fitted to the interior of the pipe or other opening and having a web inclined to the side of the flange, of a nut adapted to slide along said web, and a screw for sliding the nut to cause it to be wedged against the inside of the pipe or other opening to bind the cover thereagainst.

3. In combination, a cover for pipes or manholes formed with a flange fitted to the inside of the pipe and having an inclined pocket or channel extending longitudinally of its side, of a nut adapted to slide in the channel without turning therein, and a screw reaching down through the top of the cover and engaging the nut to draw the latter along the channel and wedge it against the inside of the pipe.

In testimony whereof I affix my signature in presence of two witnesses.

HENRY H. DAUPHINEE.

Witnesses:
HERBERT K. ALLARD,
GEO. A. WHITE, Jr.